United States Patent [19]

Gress et al.

[11] Patent Number: 5,087,013
[45] Date of Patent: Feb. 11, 1992

[54] FOLDABLE STAND FOR THREADING MACHINE

[75] Inventors: Paul W. Gress; John H. Jansen, both of Bay Village, Ohio

[73] Assignee: Emerson Electric Co., St. Louis, Mo.

[21] Appl. No.: 296,883

[22] Filed: Jan. 12, 1989

Related U.S. Application Data

[63] Continuation of Ser. No. 150,394, Jan. 29, 1988, abandoned.

[51] Int. Cl.⁵ ............................................. B62B 3/02
[52] U.S. Cl. .................................... 248/676; 248/439; 248/129
[58] Field of Search ............... 248/676, 129, 439, 641, 248/98; 280/47.13 P, 47.17, 47.18, 47.34

[56] References Cited

U.S. PATENT DOCUMENTS

| | | | |
|---|---|---|---|
| 312,016 | 2/1885 | Price | 254/4 R |
| 520,104 | 5/1894 | Buys | 280/47.34 X |
| 1,255,484 | 2/1918 | Stephens | 248/129 X |
| 1,261,184 | 4/1918 | Taylor, Jr. | 248/129 |
| 1,300,567 | 4/1919 | Brorby | 248/129 X |
| 1,947,874 | 2/1934 | Pealer | 10/87 |
| 2,078,217 | 4/1937 | Best | 280/47.34 |
| 4,611,823 | 9/1986 | Haas | 248/439 X |

FOREIGN PATENT DOCUMENTS

| | | | |
|---|---|---|---|
| 159189 | 6/1957 | Sweden | 248/98 |
| 3197 | of 1915 | United Kingdom | 280/47.18 |
| 1084761 | 9/1967 | United Kingdom | 280/47.17 |
| 2051690 | 1/1981 | United Kingdom | 280/47.18 |

OTHER PUBLICATIONS

The Ridge Tool Company, Catalog No. RT-165, May 1979, p. 24.
The Ridge Tool Company, Catalog No. RT-580, Oct. 1982, p. 40.

*Primary Examiner*—Alvin C. Chin-Shue
*Attorney, Agent, or Firm*—Body, Vickers & Daniels

[57] ABSTRACT

A foldable wheeled stand is provided for supporting a motor driven pipe threading machine during operation thereof, for transporting the machine from one location to another, and for storing the machine during periods of non-use. The stand includes an upper support portion on which the machine is mounted, and a scissors-type foldable leg assembly providing a lower support portion by which the upper support portion and threading machine can be elevated and lowered relative to an underlying support surface. Elevating and lowering is achieved through a crank actuated jackscrew arrangement. The lower support portion includes a pair of wheels, whereby the stand, when folded, can be pivoted relative to the wheels to an inclined angle at which the stand and the threading machine mounted thereon are supported by the wheels for movement along the underlying surface. Further, the lower support portion includes a pair of skids which, when the stand is folded, facilitate sliding of the stand and the reading machine mounted thereon upwardly or downwardly relative to a fixed edge or edges above the underlying surface such as would be defined for example by stairs, or the edge of the bed of a truck relative to which the stand and machine are to be loaded or unloaded.

19 Claims, 3 Drawing Sheets

FOLDABLE STAND FOR THREADING MACHINE

This is a continuation of Ser. No. 150,394 filed Jan. 29, 1988, abandoned.

BACKGROUND OF THE INVENTION

This invention relates to the art of stands for metalworking machine and, more particularly, to foldable a stand for a power driven threading machine.

The use of portable power driven pipe and rod threading machines to facilitate the on site preparation of threaded pipe and rod is of course well known, and it is likewise well known to provide a stand to support such a machine during metalworking operations. Certain such stands heretofore provided have included four ground or floor engaging legs while others have included a pair of such legs and a pair of wheels which facilitate lifting one end of the stand for the stand and the machine mounted thereon to be supported by the wheels for movement from one location to another along an underlying support surface such as a floor or ground.

While stands of the foregoing character adequately serve to support the threading machine during operation thereof and provide a degree of portability with respect to the machine, a number of problems are encountered in connection with both the portability and transportability of the machine and stand. In this respect, the loading or unloading of the stand and machine thereon relative to the bed of a truck, a loading dock or the like, may require the use of a forklift truck, an elongated ramp if the stand is wheeled, and/or the physical efforts of at least two workmen, especially in connection with physically lifting or lowering the stand and machine relative to a truck bed or dock. In connection with wheeling the stand and machine up or down a ramp, or physically lifting or lowering the stand and machine, it will be appreciated that the vast majority of the weight of the stand and machine is that of the machine alone, which may for example be 150 to 200 pounds, and that the center of gravity of the stand and machine is therefore relatively high with respect to the underlying support surface, therefore, extreme care must be taken to avoid tipping of the stand and machine during such movement thereof, adding to the physical exertion on the part of the workmen in connection with such loading or unloading operations. Furthermore, if it is necessary to move the stand and machine up or down a stairway to or from a location of use, storage or like, the tipping and physical exertion problems are multiplied. Further in connection with moving the stand and machine up or down a stairway, the wheels of wheeled stands heretofore provided interfere with such movement and add to the difficulty and physical exertion required in connection therewith by engaging against the stair riser in moving up the stairs and by having to drop along the riser between adjacent steps in going down the stairs. Accordingly, it will be appreciated that the transportation of such stands with threading machines mounted thereon is time consuming, physically tiring, and can be extremely hazardous for the workmen and potentially damaging to the machine should tipping occur.

It has been proposed to provide a foldable stand for threading machines comprised of a scissors-like leg assembly having ground engaging wheel and handle components and which is spring loaded to be moved from the folded to the extended position with the metalworking machine mounted thereon. When folded, the wheels and handle facilitate elevating one end of the stand and machine relative to ground for the stand and machine to be supported by the wheels for movement from one location to another. However, the spring force required to facilitate displacement of the stand and machine to the extended position and to maintain the latter position is such that the folding and extending operations are hazardous to a workman and can lead to injury. Furthermore, while the collapsing does lower the center of gravity of the machine so as to reduce the problem of tipping in connection with transportation of the stand and machine, the loading or unloading of the stand and machine relative to a truck bed or movement of the stand and machine up or down a stairway remains time consuming and physically demanding on the part of the workmen performing these tasks. The latter is due at least in part to the interference of the wheels of the stand with such movement thereof as described above.

Another problem encountered in connection with pipe threading machine stands heretofore provided is the susceptibility thereof to tilting about an axis transverse to the machine axis under certain work loading conditions. In this respect, such machines are capable of threading one end of an elongated pipe or rod which can extend a considerable distance beyond the end of the machine opposite the end at which threading takes place. Accordingly, if the length of the workpiece extending from the machine is too long, the weight thereof, unless separately supported, will tilt the machine relative to the underlying surface. Therefore, either a separate workpiece supporting stand is required to preclude such tilting, or operation of the machine must be limited to predetermined lengths of workpieces. Even in connection with the latter, it will be appreciated that if the workman accidentally tries to thread a workpiece which is too long, the stand and machine may tilt in the foregoing manner. Any such tilting endangers the workman and is potentially damaging to the machine.

Yet another problem encountered in connection with such stands heretofore provided is that storage of the stand and machine mounted thereon consumes considerable floor space. Even if the stand is foldable, the latter and the machine mounted thereon are in a horizontal disposition when stored and, thus, require a floor area for storage at least equal to the area of the stand and machine during use. In connection with a foldable stand, the latter may require a greater floor area for storage when folded than than unfolded. Still a further disadvantage results from the fact that the threading machine has but one working position which is at a fixed elevation relative to ground, whereby operation of the machine may be uncomfortable or awkward for many workmen.

SUMMARY OF THE INVENTION

In accordance with the present invention, an improved foldable stand is provided for power driven threading machines which provides the advantage of lowering the center of gravity of the stand and a machine mounted thereon to facilitate the portability thereof without tilting and which further provides for the loading and unloading thereof relative to a truck bed, the elevating or lowering thereof relative to an elevated edge fixed relative to ground, such as the edge of a loading platform or the like, and/or the movement of the stand and machine up or down a stairway to be facilitated in a manner which minimizes physical effort on the part of a workman or workmen, the time required to achieve such movement of the stand and machine, and the exposure of such workman or workmen to hazardous conditions. Preferably, these attributes are achieved through a foldable stand having a first or upper support portion on which the machine is mounted and a second or lower support portion which is foldable relative to the upper support portion so as to elevate and lower the upper support portion relative to an underlying support surface, and the provision of the lower support portion with wheel, skid and handle components interrelated to facilitate portability and transportability when the stand is in its folded disposition. In this respect, the handle can be grasped to elevate the folded stand and machine to an inclined disposition in which the wheels engage the underlying surface to facilitate movement of the stand and machine therealong, and the skids extend in the direction between the wheels and handle and facilitate sliding displacement of the stand and machine relative to the edge of a truck bed or loading platform, or along stairs, so as to facilitate loading, unloading and/or other sliding displacements of the stand and machine which may be desired or necessary. Preferably, the wheels and skids are relatively dimensioned and/or positioned for the outer surfaces of the wheels to be slightly spaced from the plane of the skids so that such sliding movements of the stand and machine are achieved without interference between the wheels and the edge or edges along which the skids are moved.

In accordance with another aspect of the invention, relative displacement between the upper and lower support portions by which the machine is elevated and lowered relative to the underlying support surface is achieved positively, safely and in a manner which enables adjusting the elevation of the machine relative to the underlying surface. The latter enables providing a working position for the machine which is most comfortable for a workman operating the same. Preferably, such positive elevating and lowering and thus selective positioning of the machine is achieved by interconnecting the upper and lower support portions through a jackscrew arrangement suitably actuated by the workman such as through the use of a crank.

In accordance with yet another aspect of the invention, the lower support portion of the stand is provided with an anti-tipping and storage arrangement. The component parts which provide the latter are positionally related relative to the wheels of the stand so as to restrain tipping of the machine and stand about the wheel axis during use of the machine and so as to cooperate with the wheels when the stand is folded to engage the underlying support surface to facilitate storage of the stand and machine in an inclined disposition relative to the underlying surface.

It is accordingly an outstanding object of the present invention to provide an improved foldable stand to facilitate the support and portability of a power driven threading machine mounted on the stand.

Another object is the provision of a foldable stand of the foregoing character having wheels and skids which, when the stand is folded, respectively support the stand and machine for wheeled movement relative to an underlying surface and for sliding movement relative to an edge or edges which are elevated with respect to an underlying surface.

Yet another object is the provision of a foldable stand of the foregoing character which provides for adjusting the height or use position of the machine relative to an underlying support surface when the stand is unfolded.

Still another object is the provision of a foldable stand of the foregoing character which, when unfolded to support the machine in a use position, is adapted to restrain tilting of the stand and machine about the wheel axis during a metalworking operation.

Still a further object is the provision of a foldable stand of the foregoing character which, when folded, provides for storage of the stand and machine in an inclined disposition relative to an underlying support surface.

Yet a further object is the provision of a foldable stand of the foregoing character which optimizes portability and transportability of a power driven threading machine mounted thereon, optimizes the time and physical effort required on the part of an operator or workman in connection with performing unfolding, folding, transportation and storage functions in connection with the stand and machine mounted thereon and optimizes safety with respect to the workman in connection with such functions.

Still another object is the provision of a foldable stand of the foregoing character which, with the machine mounted thereon, is easy to manually manipulate between the folded and unfolded positions thereof, is efficient in connection with its use to support a threading machine during operation thereof, and is easy and efficient to use in connection with the transportation and storage of the machine thereon during periods of non-use.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 2:
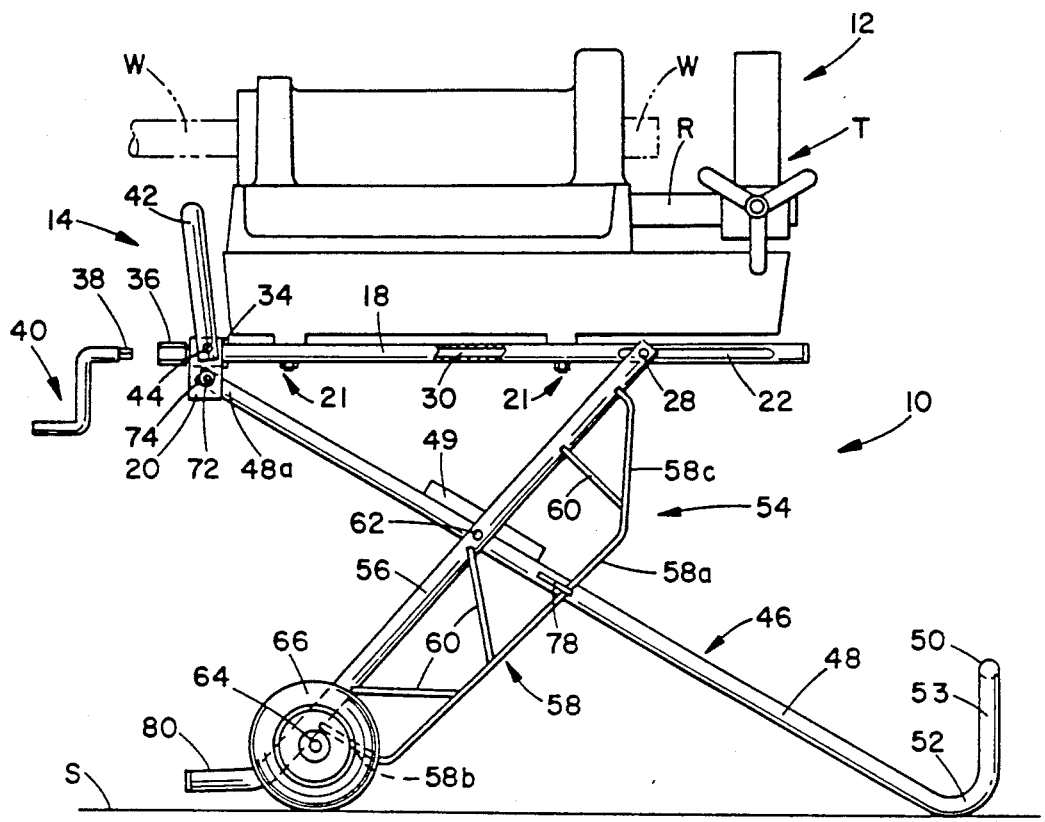
FIG. 2 is a side elevation view of the stand in its unfolded position and showing a power driven threading machine mounted on the upper support portion.

With reference now in greater detail to the drawings wherein the showings are for the purpose of illustrating a preferred embodiment of the invention only and are not for the purpose of limiting the invention, there is illustrated a foldable cart 10 for a power driven threading machine 12. Stand 10 is comprised of a first or upper support portion 14 and a second or lower support portion 16, which support portions are structured and interconnected as more fully described hereinafter for the stand to be unfolded to facilitate supporting machine 12 in a use position relative to an underlying surface S, as shown in FIG. 2, and for the stand to be folded to the position shown in FIG. 3 in which the stand facilitates the transportation and storage of the machine. The structure and operation of threading machine 12 is not important to the present invention and, as is well known in the threading machine art, the threading machine is adapted to receive a workpiece W and to rotate the workpiece relative to tooling T which is axially displaceable along rails R relative to the adjacent end of workpiece W so as to enable the performing of work thereon, such as cutting, reaming and/or threading of the workpiece end. As is further well known in connection with such threading machines, workpiece W extends through a machine spindle which is driven by a suitable motor and transmission mechanism within the machine housing. In connection with the embodiment of the stand disclosed herein, the threading machine has a length of about 33 inches, a height of about 19 inches, a width of about 16 inches, and weighs between 160 and 210 pounds.

Upper support portion 14 is comprised of a pair of longitudinally extending, parallel, tubular metal side rail members 18 having ends 18a laterally spaced apart and interconnected by a cross member 20 which, for the latter purpose, may be provided with openings axially receiving the side rail ends. The opposite end of each of the side rails 18 is provided with a longitudinally extending slot 22 extending horizontally through the inner and outer side portions thereof. As will be appreciated from the broken away portions of the side rails in FIG. 1, a yoke member 24 extends laterally between the side rails and is provided at its opposite ends with rollers 26 each of which is disposed inside the corresponding tubular side rail for rolling movement therealong. Rollers 26 are mounted on yoke 24 by means of pins 28 which extend through the corresponding slit 22 and into the yoke member 24 and have outer ends interconnected with lower support portion 16 as explained more fully hereinafter.

Rollers 26 support yoke member 24 for longitudinal displacement relative to side rails 18 between the opposite ends of slots 22, and such longitudinal displacement is achieved by means of a jackscrew arrangement including a shaft 30 having a threaded portion 32 extending through a cooperatively threaded opening in yoke member 24. The opposite end of shaft 30 extends through an opening therefor in cross member 20 and which opening supports the shaft for rotation about its axis. Shaft 30 is restrained against axial displacement relative to cross member 20 by means of a pin 34 extending through the shaft on the inner side of cross member 20 and an enlargement 36 on the outer end of the shaft which engages the outer side of cross member 20. Enlargement 36 is provided with a non-circular opening, not shown, which is adapted to receive the correspondingly contoured end 38 of a crank member 40 by which shaft 30 is adapted to be rotated in opposite directions about its axis. It will be appreciated from the foregoing description that rotation of the shaft in opposite directions about its axis results in longitudinal displacement of yoke member 24 toward and away from cross member 20. Such longitudinal displacement of yoke member 24 operates to fold and unfold cart 10 as will become apparent hereinafter.

Upper support portion 14 further includes an inverted U-shaped tubular metal handle member 42 mounted on cross member 20 for the purpose set forth hereinafter. Handle 42 can be mounted on the cross member in any suitable manner and, in the embodiment illustrated, is secured to the opposite ends of the cross member by means threaded fasteners 44 extending laterally into the cross member as will be appreciated from the showing of one such fastener in FIG. 1. Further, it will be appreciated that the openings in cross member 20 for ends 18a of the side rails can be vertically aligned with the lower ends of the legs of handle 42, whereby fasteners 44 can extend sufficiently into the cross member to extend through openings therefore in rail ends 18a to secure the rails against separation from cross member 20. As will be appreciated from FIGS. 1 and 2, side rails 18 of upper support portion 14 are provided with openings 19 therethrough which facilitate the mounting of threading machine 12 thereon such as by means of threaded fastener assemblies 21 extending through mounting feet 23 on the machine housing.

Lower support portion 16 includes one piece U-shaped tubular metal leg and handle component 46. More particularly, leg and handle component 46 is comprised of laterally spaced apart parallel legs 48 and a handle therebetween defined by a portion 50 and transition portions 52 and 53 between each leg 48 and the corresponding end of portion 50. Portion 50 is transverse to and offset form legs 48, and transition portions 52 are arcuate and engage the underlying support surface S when the stand is unfolded to support machine 12 in its use position as shown in FIG. 2. Transition portions 53 are straight and provide hand grip areas for the purpose set forth hereinafter.

Lower support portion 16 further includes a pair of leg units 54 each laterally outwardly adjacent one of the legs 48 of leg and handle component 46. Each leg unit is comprised of a tubular metal leg member 56 and a skid rail which, in the embodiment shown, is provided by a metal skid strip 58 having an elongate planar intermediate portion 58a spaced from leg 56 and opposite ends 58b and 58c extending toward and secured to leg 56 such as by welding. Intermediate portion 58a is braced relative to leg 56 by bracing strips 60 spaced apart between the opposite ends of the skid strip and welded to the latter and to leg 56. Leg units 54 are pivotally interconnected with leg and handle component 46 by means of a pivot rod 62 extending through openings therefor in legs 48 and 56 and having its opposite ends suitably secured against axial displacement from the leg members such as by cotter pins not shown. Preferably, legs 48 are reinforced in the areas thereof provided with the openings for pivot rod 62 by means of longitudinally extending plates 49 welded to the legs. The lower ends of legs 56 with respect to the positions thereof shown in FIGS. 1 and 2 are laterally interconnected by an axle rod 64 suitably secured thereto such as by welding, and the outer ends of rod 64 receive wheels 66 which engage underlying support surface S when the stand is in its unfolded position as shown in FIG. 2 of the drawing.

Figure 1:
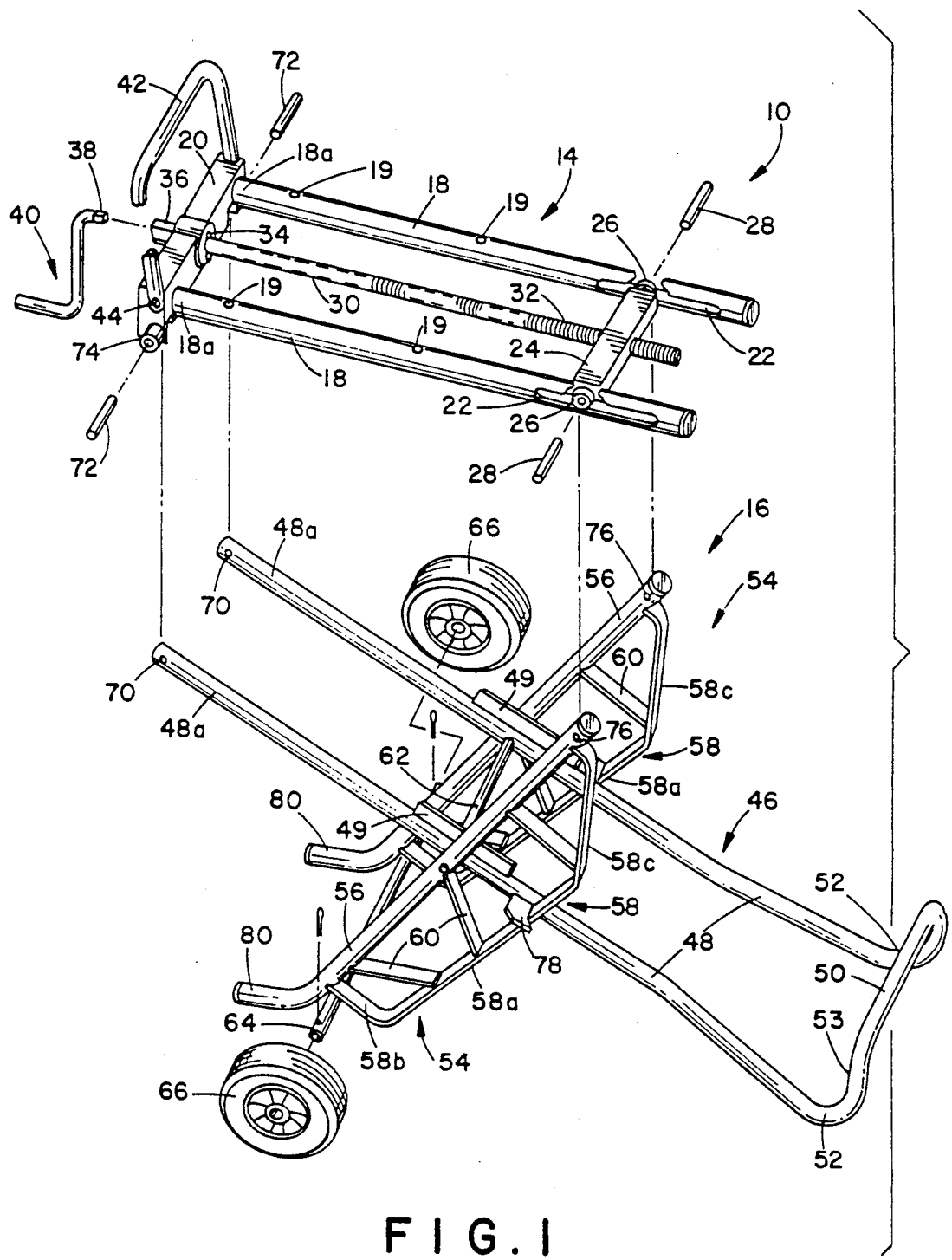
FIG. 1 is an exploded perspective view of the upper and lower support portions of a foldable stand in accordance with the present invention.

As will be appreciated from FIGS. 1 and 2 of the drawing, the underside of cross member 20 of upper support portion 14 is provided adjacent its opposite ends with slots 68 which receive the upper ends 48a of legs 48 of the handle and leg component 46. Ends 48a are provided with openings 70 therethrough and are pivotally interconnected with cross member 20 by means of corresponding pins 72 which extend through support sleeves 74 in the opposite ends of cross member 20 and thence through openings 70 and into corresponding openings in the cross member laterally inwardly of slots 68. The upper ends of leg members 56 of leg units 54 are provided with openings 76 therethrough and are positioned laterally outwardly adjacent the corresponding one of the rollers 26 on upper support portion 14 so as to be pivotally interconnected with yoke member 24 and thus upper support portion 14 by means of the pins 28 which extend through openings 76 and rollers 26 into corresponding openings therefor in yoke member 24.

For the purpose set forth hereinafter, each of the leg members 48 of leg and handle unit 46 is provided with a positioning tab 78 which is welded or otherwise secured to the leg to extend outwardly across the corresponding skid strip 58 and thence downwardly along the outer edge thereof. Likewise for the purpose set forth hereinafter, the lower ends of leg members 56 of leg units 54 extend beyond wheel axle 64 and are bent relative to the axis of the corresponding leg 56 to provide extended portions 80 which project outwardly beyond the outer surface of wheels 66.

It is believed that the following description of the operation of stand 10 with respect to the folding and unfolding thereof, and the functions of the stand in each of the folded and unfolded positions, will be readily understood from the foregoing description of the structural components of the stand and the structural interrelationships therebetween. In this respect, and presuming the component parts to be in the positions shown in FIG. 2 of the drawing in which the stand is in its erected or unfolded position, the introduction of end 38 of crank 40 into the opening therefor in enlarged end 36 of shaft 30 and the manual rotation of the shaft in one direction about its axis operates to move yoke member 24 to the right in FIGS. 1 and 2 of the drawing, whereby rollers 26 displace pins 28 and thus the upper ends of legs 56 to the right along slots 22. It will be appreciated that such displacement of pins 28 results in relative pivotal displacement between leg units 56 and leg and handle component 46 clockwise and counterclockwise, respectively, relative to pivot rod 62. Such relative pivotal displacement is facilitated by wheels 56 being in rolling engagement with the underlying support surface S, and continued rotation of crank 40 in the direction to produce such displacement ultimately results in stand 10 reaching the folded position illustrated in FIG. 3 of the drawing. Preferably, intermediate portions 58a of skid strips 58 on leg units 54 are spaced from leg members 56 of the latter such that when the skid strip portions engage surface S in the folded position wheels 66 are sightly spaced above surface S. This relative positioning is for the purpose set forth hereinafter.

Figure 3:
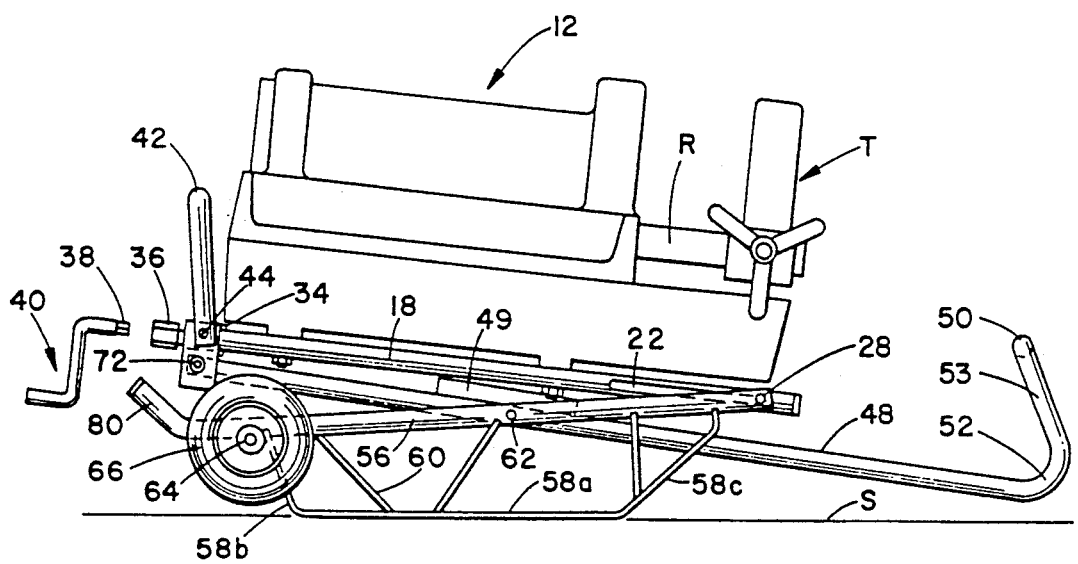
FIG. 3 is a side elevation view of the stand and threading machine in the folded position of the stand; and, FIG. 4 is a side elevation view of the folded stand and threading machine in the storage position thereof.

When the stand is in its retracted or folded position shown in FIG. 3, it will be appreciated that a workman can grasp handle portion 50 of the leg and handle component 46 and pull upwardly to pivot the stand and threading machine upwardly relative to the axis of wheel axle 64 to an inclined position. In this inclined position, the stand and threading machine are supported by wheels 66 and the workman can then grasp handle portions 53 and/or 50 and wheel the stand and machine from one location to another along surface S. Furthermore, with the folded stand in the inclined position, it will be appreciated that intermediate skid strip portions 58a advantageously provide for sliding the stand and threading machine upwardly or downwardly along a stairway, or upwardly or downwardly relative to an elevated edge such as that which would be defined by the end edge of a truck bed or the edge of a loading or unloading platform. It will be further appreciated that such displacement along a stairway and sliding displacement along the truck bed or loading platform surface can be achieved without wheels 66 interfering with sliding of the stand in that the wheels are spaced above the plane of skid strip portions 58a as described above. Such sliding of the folded stand and threading machine on the skid strips can be accomplished by pulling the stand through the use of handle portions 50 and 53 of leg and handle component 46. Further, handle 42 on cross member 20 at the opposite end of the stand can also be used in connection with such sliding displacement of the stand. Moreover, handle 42 and handle portions 50 and 53 facilitate two workmen picking up the stand and machine and carrying the latter. Accordingly, loading or unloading of the stand and threading machine relative to a truck bed or elevated platform is facilitated as is the transporting of the stand and threading machine along an underlying support surface and into any location of use which requires elevating or lowering of the stand and threading machine in an inclined disposition.

When the stand and threading machine are in the position shown in FIG. 3, rotation of crank 40 in the direction opposite that by which folding is achieved results in displacement of yoke member 26 toward cross member 20 and, thus, displacement of rollers 26 and pins 28 in the corresponding direction. Upon such displacement, leg units 56 and leg and handle component 46 pivot relative to one another about pivot rods 62 to move the stand and machine from the position shown in FIG. 3 toward the position shown in FIG. 2. Advantageously in connection with the jackscrew arrangement for achieving such displacement of yoke member 24 and the leg units and leg and handle component, threading machine 12 can be elevated to any desired position above underlying support surface S up to the position shown in FIG. 2 so as to provide a working position most suitable for a given workman. In connection with such adjustable positioning of the threading machine, positioning tabs 78 on legs 48 of leg and handle component 46 are adapted to engage the corresponding skid strip portion 58a during such unfolding and elevating of the threading machine to limit unfolding movement and thus define the uppermost position of the stand. In the latter position of the stand, tabs 78 not only determine such position but also interengage with the skid strips so as to add stability to the stand in the fully extended position thereof.

Figure 4:
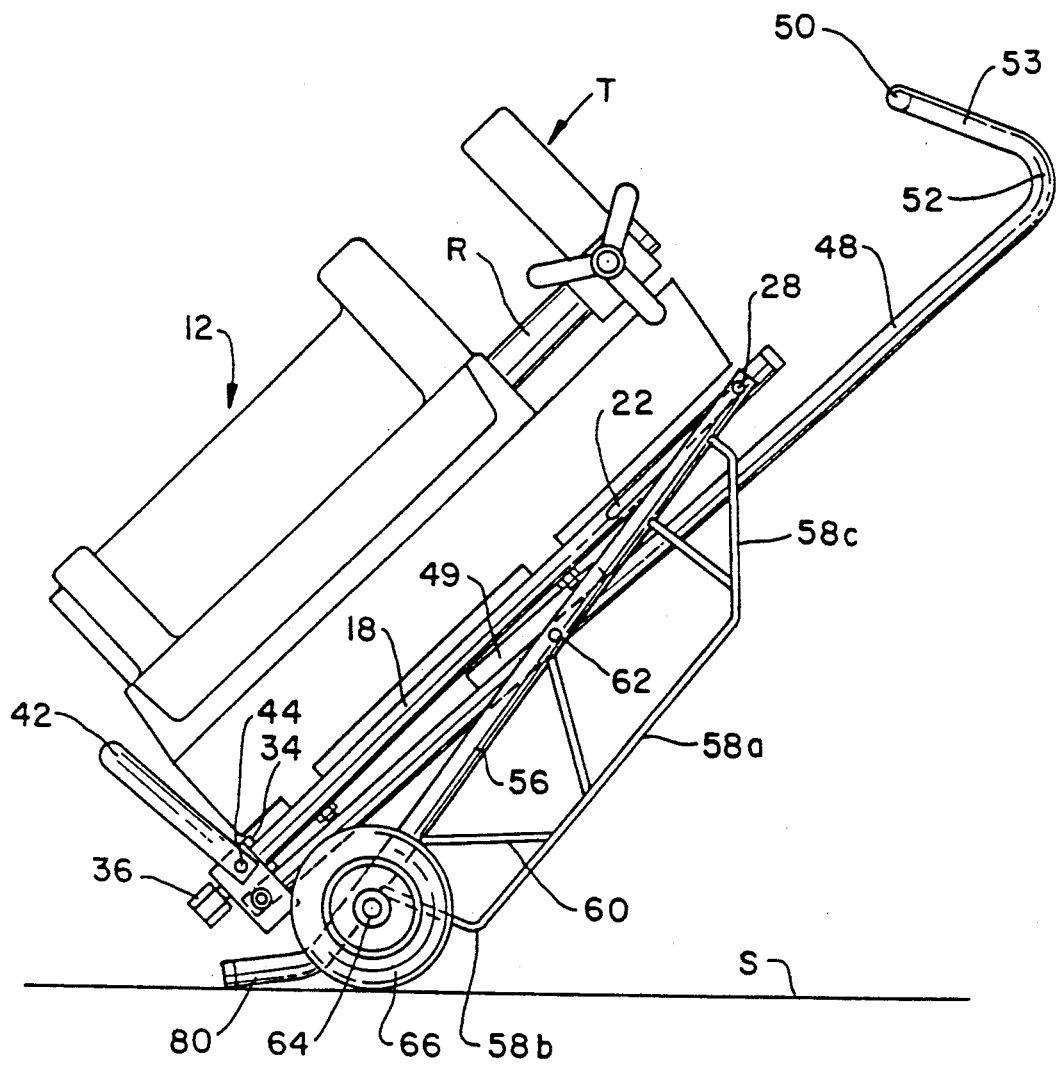

As will be appreciated from FIG. 2, when stand 10 is in the unfolded position, projections 80 extend from wheels 66 in the rearward direction with respect to the working end of threading machine 12 and are closely spaced and generally parallel to underlying surface S. Accordingly, should a workman introduce a workpiece W into the threading machine which would extend to the left from the machine as seen in FIG. 2 to such an extent that the weight of the workpiece would tend to tilt the stand and threading machine counterclockwise relative to the axis of wheel axle 64, projections 80 will engage the underlying surface S to restrain such tilting displacement and thus avoid the potential damage to the machine and/or injury to a workman which could occur if such tilting were not so restrained. Projections 80 also serve the useful purpose of cooperating with wheels 66 to support the folded stand with machine 12 thereon in an inclined disposition relative to a horizontal underlying surface S. In this respect, when the stand is folded and then pivoted to an inclined disposition as described hereinabove to facilitate rolling movement of the stand and machine relative to surface S, the stand can be further tilted or inclined for projections 80 to engage surface S together with wheels 66 as shown in FIG. 4. In such disposition of the stand and machine, the assembly is inclined sufficiently for the center gravity thereof to be in a location between wheel axle 64 and the outermost ends of projections 80, whereby the stand and machine can be stored in the inclined position. This facilitates the conservation of storage space as well as facilitating the manipulation of the stand from the storage position to the inclined position for rolling movement along the underlying support surface.

While considerable emphasis has been placed herein on the specific structures and structural interrelationships between the component parts of the foldable stand, it will be appreciated that other embodiments of the invention can be made and that many changes can be made in the embodiment herein illustrated and described without departing from the principles of the invention, whereby it is to be distinctly understood that the foregoing descriptive matter is to be interpreted merely as illustrative of the present invention and not as a limitation.

Having described the invention, it is claimed:

1. A folding stand for supporting and transporting a power driven threading machine relative to an underlying surface comprising, first support means for supporting said machine, said first support means having longitudinally opposite ends, second support means, means interconnecting said first and second support means for relative displacement between unfolded and folded positions in which said first support means is respectively elevated and lowered relative to said underlying surface, said second support means including wheel means, handle means and skid means, said wheel means and handle means respectively being adjacent one and the other of said opposite ends of said first support means when said second support means is in said folded position, said skid means including planar skid portions extending in the direction between said opposite ends when said second support means is in said folded position, said stand in said folded position of said second support means being pivotal about the axis of said wheel means to an inclined position in which said stand is supported by said wheel means for rolling movement along said underlying surface, said planar skid portions in said inclined position of said stand being inclined to facilitate sliding displacement of said stand upwardly and downwardly relative to a horizontal edge elevated above said underlying support surface, said wheel means in said unfolded position of said second support means engaging said underlying surface below said one of said opposite ends of said first support means, and said second support means including projection means extending outwardly relative to said one end beyond said wheel means and generally parallel to said underlying surface when said second support means is in said unfolded position to restrain pivoting of said stand about said wheel means in the direction outwardly of said one end.

2. A stand according to claim 1, wherein said means interconnecting said first and second support means includes means for adjusting said displacement to selectively vary said unfolded position and thus the elevation of said first support means relative to said underlying surface.

3. A stand according to claim 2, wherein said second support means includes means to limit the uppermost elevation of said first support means relative to said underlying surface.

4. A stand according to claim 1, wherein said projection means and wheel means in said folded position of said second support means provide for said stand and a machine thereon to be pivoted relative to the axis of said wheel means to an inclined storage position in which said wheel means and projection means engage said underlying surface to support said stand and machine in said inclined storage position.

5. A stand according to claim 1, wherein said handle means is outwardly adjacent the other of said opposite ends of said first support means when said second support means is in said folded position.

6. A stand according to claim 1, wherein said wheel means and said handle means engage said underlying surface when said second support means is in said unfolded position.

7. A folding stand for supporting and transporting a power driven threading machine relative to an underlying surface comprising, first support means for supporting said machine, said first support means having longitudinally opposite ends, second support means, means interconnecting said first and second support means for relative displacement between unfolded and folded positions in which said first support means is respectively elevated and lowered relative to said underlying surface, said second support means including wheel means, handle means and skid means, said wheel means and handle means respectively being adjacent one and the other of said opposite ends of said first support means when said second support means is in said folded position, said skid means including planar skid portions extending in the direction between said opposite ends when said second support means is in said folded position, said stand in said folded position of said second support means being pivotal about the axis of said wheel means to an inclined position in which said stand is supported by said wheel means for rolling movement along said underlying surface, said planar skid portions in said inclined position of said stand being inclined to facilitate sliding displacement of said stand upwardly and downwardly relative to a horizontal edge elevated above said underlying support surface, said wheel means and said handle means engaging said underlying surface when said second support means is in said unfolded position, said wheel means in said unfolded position of said second support means engaging said underlying surface below said one of said opposite ends of said first support means, and said second support means including projection means extending outwardly relative to said one end beyond said wheel means and generally parallel to said underlying surface when said second support means is in said unfolded position to restrain pivoting of said stand about said wheel means in the direction outwardly of said one end.

8. A stand according to claim 7, wherein said projection means and wheel means in said folded position of said second support means provide for said stand and a machine thereon to be pivoted relative to the axis of said wheel means to an inclined storage position in which said wheel means and projection means engage said underlying surface to support said stand and machine in said inclined storage position.

9. A folding stand for supporting, transporting and storing a power driven threading machine relative to an underlying surface comprising, first support means for supporting said machine, said first support means having longitudinally opposite ends, second support means, means interconnecting said first and second support means for relative displacement between unfolded and folded positions in which said first support means is respectively elevated and lowered relative to said underlying surface, said second support means including wheel means and projection means below one of said opposite ends of said first support means when said second support means is in said unfolded position, said wheel means in said unfolded position engaging said underlying surface and said projection means in said unfolded position being spaced above and generally parallel to said underlying surface and outwardly of said one end beyond said wheel means and below the axis thereof to restrain pivoting of said stand about said axis of said wheel means in the direction outwardly of said one end, said wheel means and projection means in said folded position of said second support means providing for said stand to be pivoted upwardly relative to said underlying surface and about the axis of said wheel means to an inclined position at an angle less than 90° relative to said underlying surface, said wheel means and projection means in said inclined position engaging said underlying surface to provide an inclined storage position for said stand and a machine thereon.

10. A stand according to claim 9, wherein said means interconnecting said first and second support means includes means for adjusting said relative displacement to selectively vary said unfolded position and thus the elevation of said first support means relative to said underlying surface.

11. A stand according to claim 10, wherein said second support means includes means to limit the uppermost elevation of said first support means relative to said underlying surface.

12. A stand according to claim 9, wherein said second support means includes handle means adjacent the other of said opposite ends of said first support means when said second support means is in said folded position.

13. A stand according to claim 12, wherein said wheel means and said handle means engage said underlying surface when said second support means is in said unfolded position.

14. A folding stand for supporting and transporting a power driven threading machine relative to an underlying surface comprising, support means for said machine, first and second leg means interconnected with said support means for displacement between extended and retracted positions relative thereto in which said support means is respectively elevated and lowered relative to said underlying surface, means including rotatable screw means on said support means for displacing said first and second leg means between said extended and retracted positions, said first and second leg means including wheel means and handle means engaging said underlying surface to support said support means relative to said underlying surface when said first and second leg means are in said extended position, and one of said first and second leg means including planar skid means extending therealong, said wheel means and handle means being spaced above the plane of said planar skid means when said first and second leg means are in said retracted position, said stand in said retracted position of said first and second leg means being pivotal about the axis of said wheel means to position said support means in an inclined position in which said stand is supported by said wheel means for rolling movement along said underlying surface, and said planar skid means being inclined in said inclined position of said support means to facilitate sliding displacement of said stand upwardly and downwardly relative to a horizontal edge elevated above said underlying support surface.

15. A stand according to claim 14, wherein said support means has opposite ends and said first and second leg means have corresponding first and second ends, means pivotally interconnecting said first and second leg means between said first and second ends thereof, means pivotally interconnecting said first end of said first leg means with said support means adjacent one of said opposite ends, means including yoke means interconnecting said first end of said second leg means with said support means adjacent the other of said opposite ends for displacement toward and away from said one end, said rotatable screw means interengaging with said yoke means for displacing said first end of said second leg means toward and away from said one end to respectively displace said first and second leg means toward said extended and retracted positions thereof.

16. A stand according to claim 15, wherein said first and second leg means include means interengaging to limit displacement thereof in the direction toward said extended position.

17. A stand according to claim 15, wherein said second end of one of said first and second leg means includes said wheel means and said second end of the other leg means includes said handle means.

18. A stand according to claim 15, wherein said one of said first and second leg means includes said skid means between said first and second ends thereof.

19. A stand according to claim 17, wherein said wheel means underlie one of said opposite ends of said support means, and said second end of said one leg means includes projection means extending outwardly relative to said one end of said support means beyond said wheel means and spaced above and generally parallel to said underlying surface when said first and second leg means are in said extended position, said projection means restraining tipping of said stand about the axis of said wheel means outwardly of said one end of said support means when said first and second leg means are in said extended position, and said wheel means and projection means in said retracted position of said first and second leg means providing for said stand and machine to be pivoted upwardly relative to said underlying surface and about the axis of said wheel means to an inclined position at an angle less than 90° relative to said underlying surface, said wheel means and projection means in said inclined position engaging said underlying surface to provide an inclined storage position for said stand and a machine thereon.

* * * * *